UNITED STATES PATENT OFFICE.

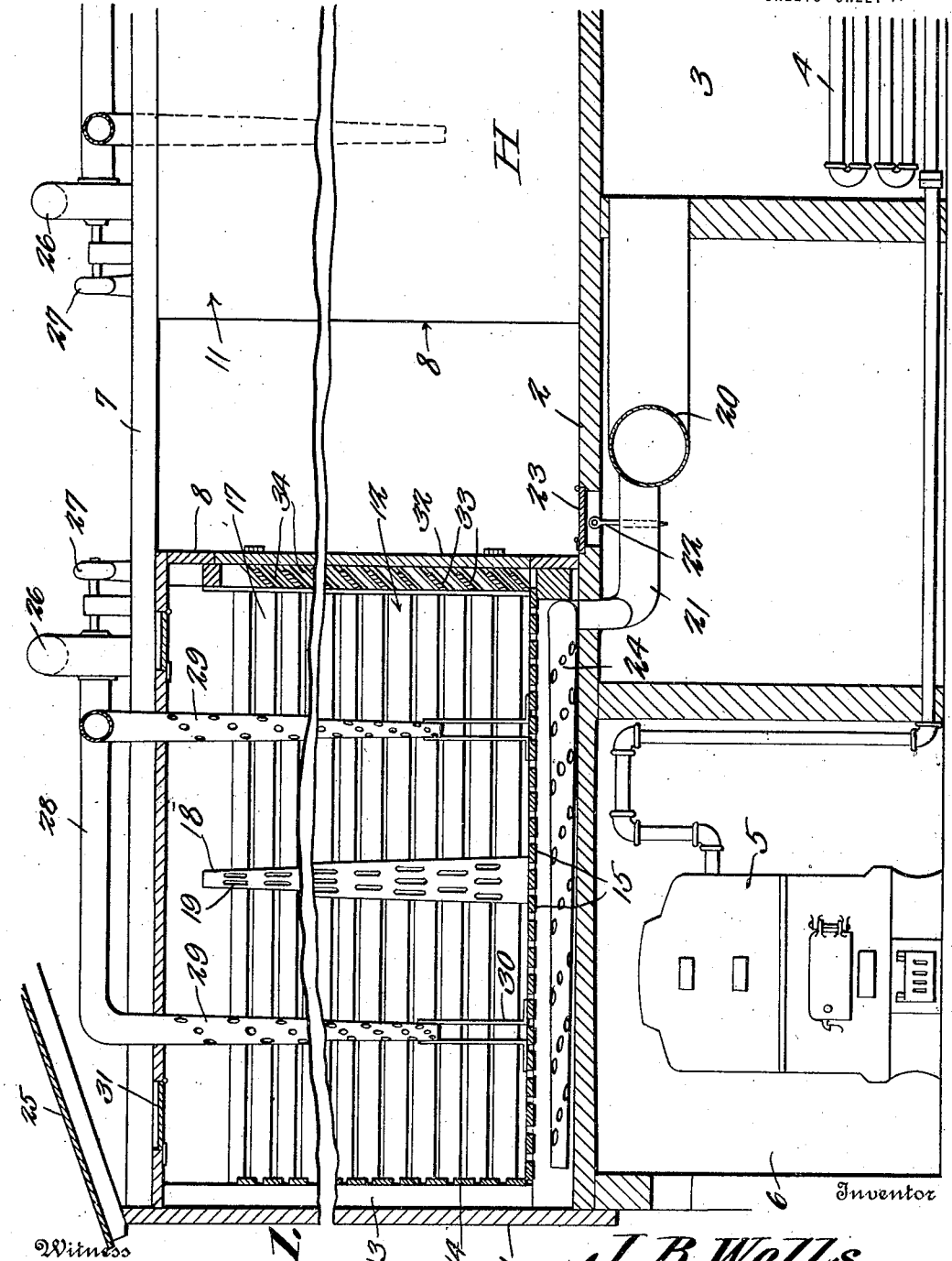

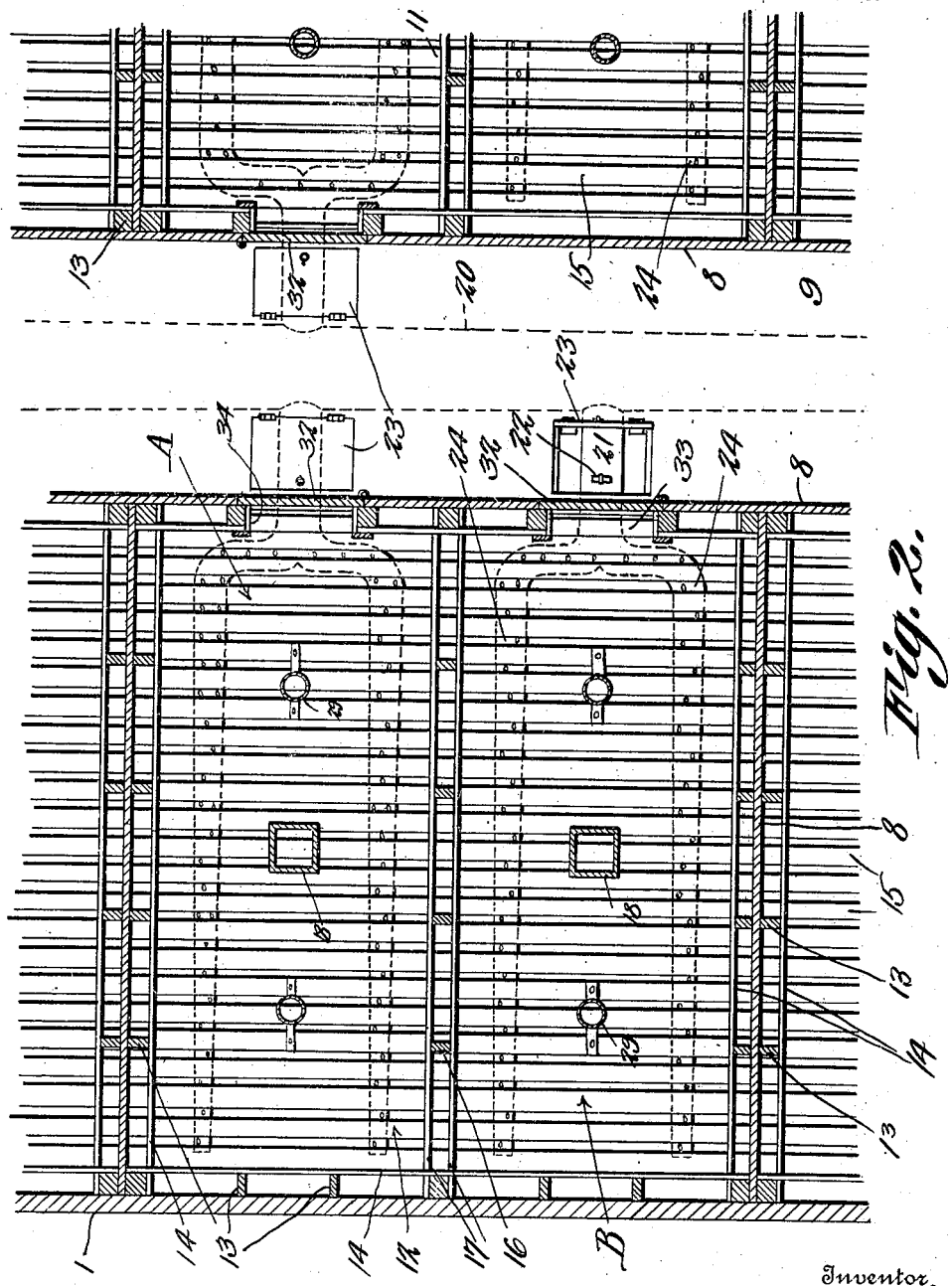

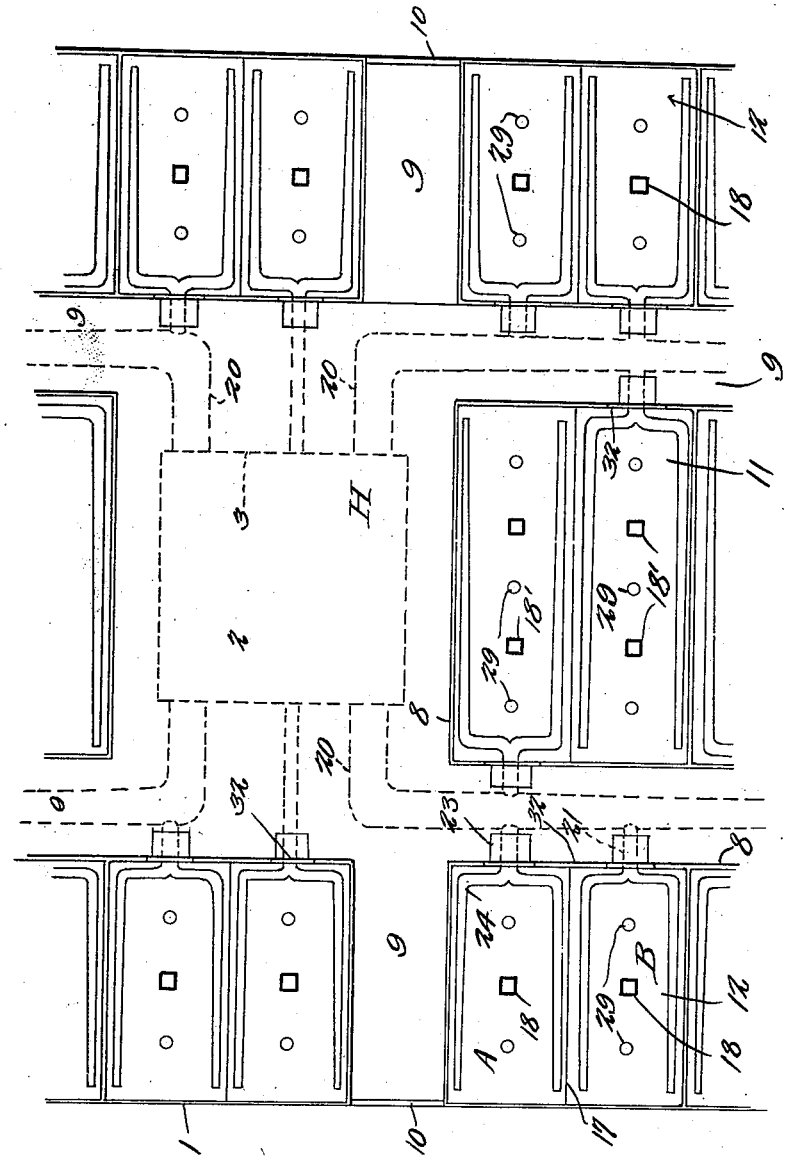

JAMES BARBER WELLS, OF JACKSONVILLE, TEXAS.

POTATO-CURING APPARATUS.

1,370,174.  Specification of Letters Patent.  Patented Mar. 1, 1921.

Application filed February 7, 1920. Serial No. 356,996.

*To all whom it may concern:*

Be it known that I, JAMES B. WELLS, a citizen of the United States, residing at Jacksonville, in the county of Cherokee and State of Texas, have invented a new and useful Potato-Curing Apparatus, of which the following is a specification.

This invention relates to apparatus for use in curing sweet potatoes and the like, one of the objects being to provide improved means for circulation of heated air through the storage bins in which the potatoes are located so that all objectionable moisture will be removed quickly and efficiently, thereby preserving the potatoes from rot and keeping them in good condition as long as desired.

Another object is to provide curing apparatus including a house having a plurality of independent storage units each of which is provided with its individual ventilating apparatus, each of said units being adapted to be opened without affecting the remaining units, so that during the storage of potatoes in or their removal from a unit cold air will be kept from the remaining units and all the contents of the house will be protected and the heat conserved.

A further and very important object is to utilize suction as a medium for drawing the heated air into the various units of the apparatus and, at the same time, withdrawing the moisture from said units, the partial vacuum thus obtained allowing the use of a lower temperature than would otherwise be necessary to obtain the desired results and producing a more uniform temperature in all portions of each unit than would be possible where heated air is forced into the unit under pressure.

Another object is to provide efficient means for effecting the proper distribution of air to convey moisture from the units and to bring the heated air into contact with all portions of the contents of the unit.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a vertical transverse section through a portion of a curing house having the present improvements.

Fig. 2 is a horizontal section through a portion of the curing house and showing one complete unit and portions of adjacent units.

Fig. 3 is a diagram showing the relative positions of several units in a curing house.

Referring to the figures by characters of reference, 1 designates a house of any desired size and proportions provided under the central portion of the floor 2 thereof, or at any other desired point, with the heating room 3. This room preferably is provided with steam coils 4 supplied from a heater 5 located wherever desired as in a room 6.

The space within the house above the floor 2 and below the ceiling 7 is divided by walls 8 into a hall H located over the heating room 3 and corridors 9 leading to doors located at different points in the exterior walls of the house and some of which have been shown at 10. The innermost walls 8 define large curing units 11 filling the space between the corridors 9 extending longitudinally of the house, while the outer walls 8 coöperate with the outside walls of the house to form smaller curing units located between said longitudinal corridors and the outer walls of the house, and indicated at 12. Each unit 11 and 12 has sealed walls extending from the floor to the ceiling and studding is provided vertically on the inner sides of the walls, as shown at 13. To the studding are secured horizontally arranged slats designed to keep the contents of the units spaced from the sealed walls, these slats being shown at 14. Slats 15 form the bottom of each heating unit and are spaced from the floor 2.

One or more partitions may be formed in each unit to divide it into separate compartments A and B, each of these partitions consisting of vertically disposed studs 16 having horizontal slats 17 secured to the sides thereof. The partition does not extend to the ceiling but, instead, a clear space is provided thereabove. Secured on the slatted bottom of each unit at the center of each of the compartments A and B is a distributing core 18 having slots or the like therein as at 19, and preferably tapered toward its upper end. In the compartments in the larger units 11 two of these cores can be provided in each compartment as shown at 18'.

Extending from the heating room 3 are conduits 20 located below the floor 2 and extending from these conduits are branches 21 each of which has a damper 22 whereby the flow of heated air through the branch can be controlled. Each damper can be reached and operated by opening a trap 23 in the floor 2 or in any other manner desired. From each branch conduit 21 extends tapered outlet tubes 24 which are located above the floor 2 and beneath the slatted bottoms 15, there being, preferably, two of these tubes under the slatted bottom of each chamber or compartment A and B of a unit. It will be noted, furthermore, that the tubes are disposed at points between the sides and center of each chamber or compartment. These tubes are provided with small apertures from which heated air will escape into the space below the slatted bottoms 15.

Arranged in the space between the ceiling 7 and the roof 25 of the house 1 are suction fans indicated generally at 26 and each of which is provided with an individual motor 27. One of these fans is provided for each unit 11 and 12 and extending from the casing of each fan is a flue 28 having tubular branches 29 extending downwardly therefrom into the compartments A and B of the unit to which the fan belongs. The branches are preferably tapered downwardly and are apertured, said branches being located between the ends of each compartment and the central core. Where more than one core is provided, as in the units 11, another branch can be extended between the cores, as shown. The lower ends of the tubes or branches 29 can be extended into tubular centering members or braces indicated at 30. Trap doors 31 can be provided in the ceiling 7 to open into each compartment of each unit and each compartment of each unit is provided with a door 32 opening into one of the corridors 9. The large units 11 are provided with two such doors, one at each end. In every instance a series of superposed spaced slats 33 is located in each unit close to and adjacent the inner side of each door, these slats being inclined downwardly and inwardly and being removably mounted between supporting cleats 34. Thus the contents of the compartments are held spaced from the doors thereof and air is allowed to circulate between said doors and contents.

When the apparatus is in use air is heated in the room 3 and sweet potatoes or the like are delivered into the compartments of one of the units after which the doors of said compartments are closed, the slats 33 first being placed in position. The damper 22 controlling the supply of heated air to said unit is then opened and the fan used with said unit is set in operation. This fan will suck air from the unit, carrying therewith a considerable amount of moisture and the air thus removed will be replaced by heated air admitted from the openings in the tubes 24. This heated air will flow upwardly between the slats at the bottom of the unit and upwardly within the walls and partitions. The suction through the branches 29 will draw this heated air between the mass of potatoes, the cores 18 serving either to facilitate the distribution of the heated air or the withdrawal of the moisture laden air. By utilizing suction in the manner stated moisture laden air is withdrawn from every portion of the unit and is promptly supplanted by the fresh heated air. As each unit is practically sealed, a partial vacuum is produced therein during the operation of the fan, so that evaporation will be increased without proportionately increasing the temperature.

Importance is attached to the fact that the various units are sealed one from the other because while one unit is being filled or emptied, there is no change in the temperature of the other units. Furthermore this arrangement permits the various units to be filled and emptied at different times and potatoes in one unit can be at a different stage of the curing process than the contents of the other units.

In drying the potatoes it is the practice usually to maintain a temperature in the unit of from 76° to 90° F. and after the desired drying or curing has been effected the temperature can be maintained at approximately 60° F.

What is claimed is:—

1. Potato curing apparatus including a plurality of independent, normally sealed units, a heating room, a gradually tapered conduit extending therefrom, tapered apertured outlet tubes for conducting heated air in controllable quantities from said conduit to the walls and bottom portion of each unit, said walls and bottom portions having slatted inner faces for the escape of heated air into the units, means for conducting heated air upwardly into the middle portions of the respective units, and means for creating a suction of air from the respective units to create currents of heated air through the contents of the units and between the heat conducting means in the units and the walls and bottom portions thereof.

2. Potato curing apparatus including a plurality of independent, normally sealed units, a heating room, means for conducting heated air from said room in controllable quantities to the walls and bottom portions of the respective units, heated air distributing means extending upwardly into each unit from the bottom portion thereof, outlet flues for moisture laden air located between said distributing means and the walls of the units, there being openings in the walls and bottom portion of each unit for the flow of heated air toward said outlet flues, and independent means for the respective units for exhausting air from said units through the outlet flues, thereby to establish a partial vacuum within the respective sealed units.

3. In potato curing apparatus a unit having walls and floor constituting means for conducting heated air, said walls and floor having air outlet openings for the escape of air into the unit, a distributing core within the unit and spaced from the walls thereof, the space between said core and walls being provided for the reception of the potatoes to be cured, apertured outlet flues located between the core and walls and adapted to be surrounded by the potatoes being cured, means for conducting heated air in controllable quantities to the interior of the floor and walls and core, and means for withdrawing moisture laden air through the outlet flues to create a partial vacuum within the unit and set up a circulation of heated air from the conducting means through the floor and walls and core and thence through the mass of potatoes to the outlet flues.

In testimony that I claim the foregoing as my own, I have hereto affixed my signature in the presence of two witnesses.

JAMES BARBER WELLS.

Witnesses:
   LEE G. COSTER,
   G. W. CARLIN.